United States Patent
Teshirogi et al.

(10) Patent No.: US 12,538,909 B2
(45) Date of Patent: Feb. 3, 2026

(54) FISHING ROD REEL SEAT, FISHING ROD, AND FIXING NUT

(71) Applicant: GLOBERIDE, Inc., Tokyo (JP)

(72) Inventors: Hideaki Teshirogi, Tokyo (JP); Shintaro Nakagawa, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 65 days.

(21) Appl. No.: 18/111,748

(22) Filed: Feb. 20, 2023

(65) Prior Publication Data

US 2023/0276778 A1 Sep. 7, 2023

(30) Foreign Application Priority Data

Mar. 2, 2022 (JP) ................................. 2022-032196

(51) Int. Cl.
*A01K 87/06* (2006.01)
(52) U.S. Cl.
CPC .................................... *A01K 87/06* (2013.01)
(58) Field of Classification Search
CPC ...... A01K 87/06; A01K 87/00; F16B 37/0885
See application file for complete search history.

(56) References Cited

U.S. PATENT DOCUMENTS

| | | | | |
|---|---|---|---|---|
| 4,132,146 A * | 1/1979 | Uhlig | .................. | F16B 37/0885 411/433 |
| 4,556,352 A * | 12/1985 | Resnicow | ................. | F16D 1/06 411/433 |
| 6,821,070 B1 * | 11/2004 | Thompson | .......... | F16B 37/0885 411/432 |
| 6,871,441 B1 * | 3/2005 | Tsurufuji | ............... | A01K 87/06 43/22 |
| 7,752,800 B2 * | 7/2010 | Leyden | .................. | A01K 87/06 43/22 |
| 10,772,311 B1 * | 9/2020 | Ashikaga | ............... | A01K 87/06 |

FOREIGN PATENT DOCUMENTS

| | | |
|---|---|---|
| CN | 203009530 U | 6/2013 |
| GB | 2414946 B | 7/2006 |
| JP | S48-018648 | 3/1973 |
| JP | 2001321033 A * | 11/2001 |

(Continued)

OTHER PUBLICATIONS

Translation of JP-2001333667-A (Year: 2001).*

(Continued)

*Primary Examiner* — Kimberly S Berona
*Assistant Examiner* — Steven J Shur
(74) *Attorney, Agent, or Firm* — Oliff PLC (57) ABSTRACT

A fishing rod reel seat according to one embodiment of the present disclosure comprises a reel seat main body on which a reel leg placing portion on which a reel leg is placed is formed, a cylindrical moving hood that is guided by an outer surface of the reel seat main body and is movable along an axial direction of the reel seat main body, and a cylindrical fixing nut that is provided on the outer surface of the reel seat main body and holds a position of the moving hood in the axial direction, in which the fixing nut comprises an engaging portion and an engaged portion, and the fixing nut is made detachable from the reel seat main body by releasing engagement between the engaging portion and the engaged portion.

7 Claims, 11 Drawing Sheets

(56) References Cited

FOREIGN PATENT DOCUMENTS

| | | | |
|---|---|---|---|
| JP | 2001333667 A | * | 12/2001 |
| JP | 2008-190708 A | | 8/2008 |
| JP | 1419504 S | | 6/2011 |
| JP | 2013-121342 A | | 6/2013 |
| JP | 1496932 S | | 4/2014 |

OTHER PUBLICATIONS

Translation of JP-2001321033-A (Year: 2001).*
Feb. 26, 2024 Office Action issued in Australian Patent Application No. 2023200854.
Combined Search and Examination Report in connection with UK Patent Application No. 2302428.4; action mailed on Jul. 21, 2023; (5 pages).
Dec. 11, 2024 Office Acction issued in Japanese Application No. 2022-032196.
1 May 8, 2025 Office Action issued in Singapore Application No. 10202300357U.
Nov. 1, 21, 2025 Office Action issued in Chinese Application No. 202310155083.0.

* cited by examiner

FISHING ROD REEL SEAT, FISHING ROD, AND FIXING NUT

CROSS-REFERENCE TO RELATED APPLICATION

This application claims priority under 35 U.S.C. § 119 to Japanese Patent Application No. 2022-032196 filed on Mar. 2, 2022 in the Japanese Patent Office, the entire contents of which is hereby incorporated by reference.

FIELD

The present disclosure relates to a fixing nut, a fishing rod reel seat comprising the fixing nut, and a fishing rod comprising the fishing rod reel seat.

BACKGROUND

Conventionally, various fishing rods including a fishing rod reel seat have been known.

In such a fishing rod, a fishing rod reel seat is usually placed on a rod body, and the fishing rod reel seat is formed with a reel leg placing portion for placing a reel leg on an upper side or a lower side of a main body, a hood for holding a leg portion of the reel leg from the front and the rear, and a fixing nut. Such a fixing nut may be provided with an anti-loosening member to prevent the locking nut from loosening.

For example, JP 2001-321033 A discloses a reel seat including a reel foot pad portion, a screw portion, a hood for inserting and fixing the reel foot, and a fixing nut for fixing the hood, in which the screw portion is provided with a detachable anti-loosening member for preventing loosening of the fixing nut.

In addition, JP 2001-333667 A discloses a reel seat including a reel foot pad portion, a screw portion, a hood for inserting and fixing the reel foot, a fixing nut for fixing the hood, and a hood guide groove for moving the hood, the reel seat including a detachable anti-loosening member for preventing loosening of the fixing nut.

SUMMARY

However, in the reel seat disclosed in JP 2001-321033 A, although the reel seat is freely detachable, the anti-loosening member itself is easily loosened with respect to the reel seat main body, and consequently, it is difficult to reliably prevent loosening of the fixing nut. In addition, since the anti-loosening member is structurally formed only in a part of the reel seat main body in a circumferential direction, there is a problem that a sense of discomfort is felt when a finger comes in contact therewith.

In addition, although the reel seat disclosed in JP 2001-333667 A can be freely removed, since the anti-loosening member itself is easily loosened with respect to the reel seat main body, it is difficult to reliably prevent loosening of the fixing nut, and there is a problem that a sense of discomfort is felt when a finger comes in contact with a locking portion of the anti-loosening member in terms of structure.

The present disclosure has been made in view of the above circumstances, and an object thereof is to provide a fixing nut that can flexibly cope with diameter dimensions of various reel seats, is not easily loosened during use while being freely attachable to and detachable from a reel seat main body, and is less likely to cause a sense of discomfort when a finger comes in contact, a fishing rod reel seat comprising the fixing nut, and a fishing rod comprising such a fishing rod reel seat. Purposes of the present disclosure other than this object will be clarified by referring to the overall description disclosed herein.

A fishing rod reel seat according to one embodiment of the present disclosure comprises a reel seat main body on which a reel leg placing portion on which a reel leg is placed is formed, a cylindrical moving hood that is guided by an outer surface of the reel seat main body and is movable along an axial direction of the reel seat main body, and a cylindrical fixing nut that is provided on the outer surface of the reel seat main body and holds a position of the moving hood in the axial direction, in which the fixing nut comprises an engaging portion and an engaged portion, and the fixing nut is made detachable from the reel seat main body by releasing engagement between the engaging portion and the engaged portion.

The fishing rod reel seat according to one embodiment of the present disclosure is configured such that each of the engaging portion and the engaged portion comprises a base portion and an uneven portion.

The fishing rod reel seat according to one embodiment of the present disclosure is configured such that the engaging portion and the engaged portion are separated from each other in a circumferential direction of the fixing nut in a disengaged state.

The fishing rod reel seat according to one embodiment of the present disclosure is configured such that the engaging portion and the engaged portion partially overlap each other when viewed in a circumferential direction of the fixing nut in a disengaged state.

The fishing rod reel seat according to one embodiment of the present disclosure is configured such that the engaging portion is a protruding portion protruding in a circumferential direction of the fixing nut, and the engaged portion comprises a recessed portion capable of accommodating at least a part of the protruding portion.

The fishing rod reel seat according to one embodiment of the present disclosure is configured such that the protruding portion of the engaging portion and the recessed portion of the engaged portion are formed with respective uneven portions at the engaging portion and the engaged portion.

A fishing rod according to one embodiment of the present disclosure is provided with any one of the fishing rod reel seats described above and a rod body.

A fixing nut according to one embodiment of the present disclosure is a cylindrical fixing nut that is guided by an outer surface of a reel seat main body on which a reel leg placing portion on which a reel leg is placed is formed and holds a position in an axial direction of a cylindrical moving hood movable along the axial direction of the reel seat main body, the fixing nut being provided on the outer surface of the reel seat main body, the fixing nut comprising an engaging portion and an engaged portion, in which the fixing nut is made detachable from the reel seat main body by releasing the engagement between the engaging portion and the engaged portion.

According to the above embodiment, it is possible to provide a fixing nut that can flexibly cope with the diameter dimensions of various reel seats, is not easily loosened during use, and is less likely to cause a sense of discomfort when touched with a finger while being freely detachable from the reel seat main body, a fishing rod reel seat comprising the fixing nut, and a fishing rod comprising the fishing rod reel seat.

DETAILED DESCRIPTION

Hereinafter, an embodiment of a fishing rod according to the present disclosure will be specifically described with reference to the accompanying drawings. Components common to a plurality of drawings are denoted by the same reference numerals throughout the plurality of drawings. Note that the drawings are not necessarily drawn to scale for convenience of description.

Figure 1:
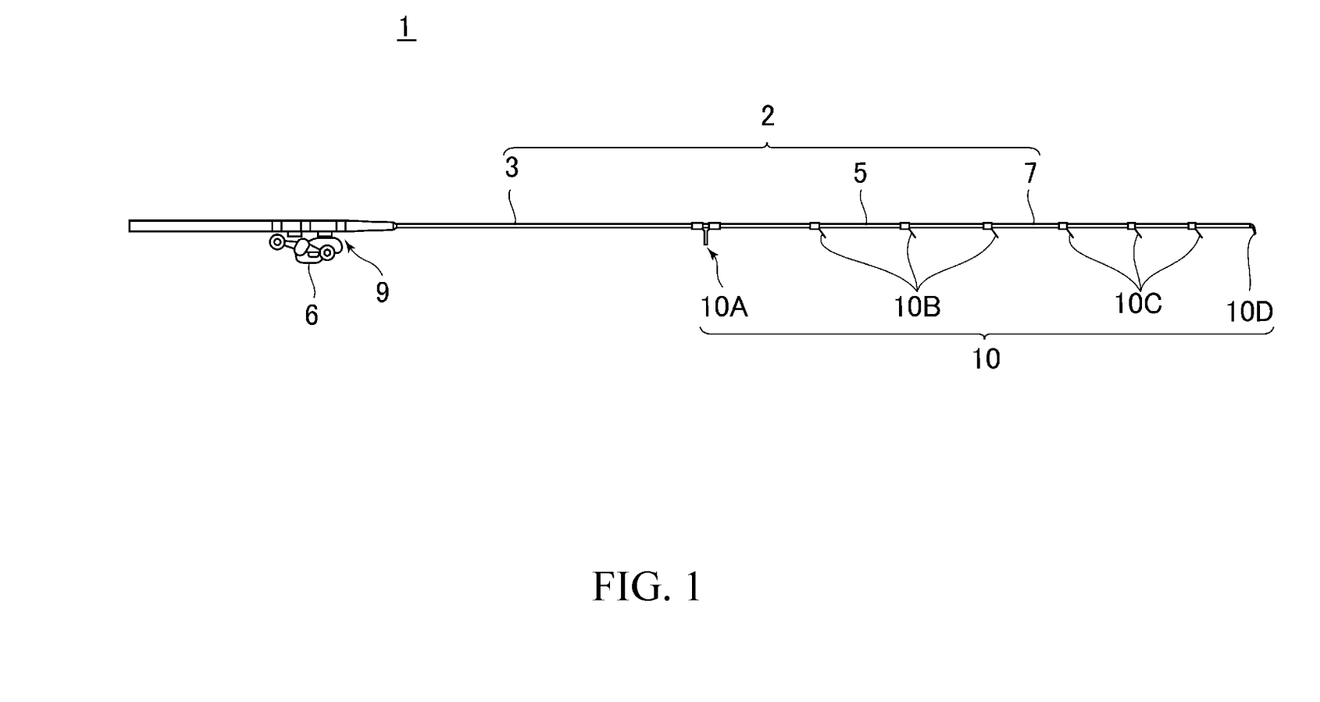
FIG. 1 is a view illustrating a fishing rod according to one embodiment of the present disclosure.

FIG. 1 is a view illustrating a fishing rod according to one embodiment of the present disclosure. As illustrated in the drawings, a fishing rod 1 according to one embodiment of the present disclosure comprises a rod body 2, a reel 6 attached to the rod body 2 via a reel seat 9, and a fishing line guide 10 attached to the rod body 2. In the illustrated embodiment, the reel seat 9 and each of the fishing line guides 10 correspond to attachment components attached to an outer peripheral surface of the rod body.

The rod body 2 is constituted by, for example, connecting a base rod 3, a middle rod 5, a tip rod 7, and the like to each other. These rod bodies are joined to each other, for example, by an ordinarily jointed type. The base rod 3, the middle rod 5, and the tip rod 7 can be joined to each other by a telescopic type, an inversely jointed type, a socket-and-spigot jointed type, or any other known joining method. The rod body 2 may be formed of a single rod body.

The base rod 3, the middle rod 5, and the tip rod 7 are each made of, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. In addition, an outer surface of the tubular body is appropriately polished. Each of the rod bodies may be formed in a solid state.

In the illustrated embodiment, the base rod 3, the middle rod 5, and the tip rod 7 comprise a plurality of fishing line guides 10 (fishing line guides 10A to 10D) for guiding a fishing line fed from the reel 6 attached to the reel seat 9. More specifically, the base rod 3 comprises the fishing line guide 10A, the middle rod 5 comprises the fishing line guide 10B, and the tip rod 7 comprises the fishing line guide 10C. The tip rod 7 comprises the top guide 10D at a tip thereof, but details thereof are omitted.

Next, the reel seat 9 comprising a reel seat main body 12 and a fixing nut 8 will be described with reference to FIG. 2. The reel seat 9 comprises the reel seat main body 12 having, along its axial direction, a reel leg placing surface (reel leg placing portion) 12a on which a reel leg 6a of the fishing reel 6 is placed. The reel seat main body 12 is formed in a cylindrical shape as a whole. Further, the reel seat main body 12 is formed of an appropriate material such as a synthetic resin (for example, polyamide synthetic fiber, ABS resin, or the like) or metal (for example, SUS, aluminum, titanium, brass, or the like). The reel seat main body 12 can have a length of 60 to 160 mm, for example, but is not limited thereto.

In addition, the reel seat main body 12 comprises a grip portion 12b that is a slightly bulged portion from the opposite side of the reel leg placing surface 12a and has an easy-to-grip curved outer surface that supports a thenar and an area near the thenar when gripped with a gripping hand.

Figure 2:
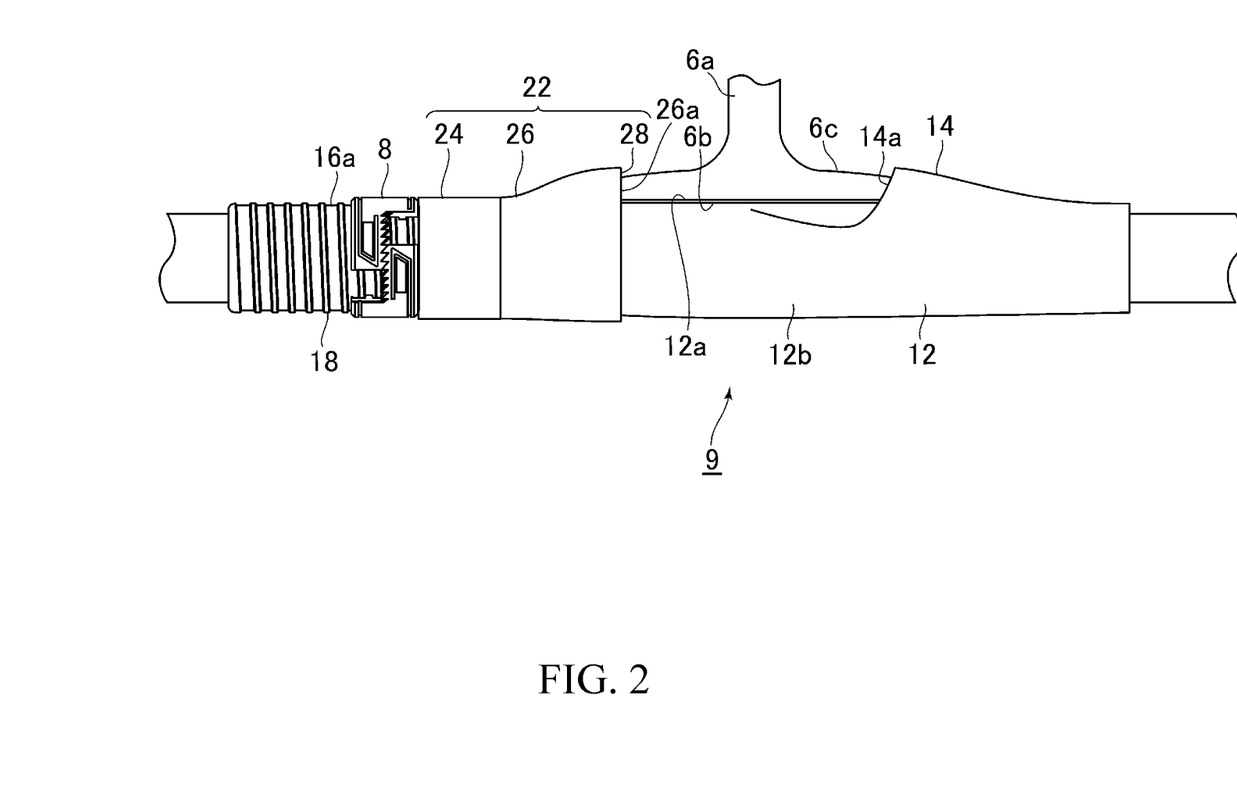
FIG. 2 is a view illustrating a fishing rod reel seat according to one embodiment of the present disclosure.

The reel leg placing surface 12a of the reel seat main body 12 can be formed flat or substantially flat with a curvature larger than that of another circumferential portion (for example, the grip portion 12b) adjacent to the reel leg placing surface 12a of the reel seat main body 12, and is formed so as to extend in an axial direction of the reel seat main body 12 illustrated in FIG. 2. The reel seat main body 12 comprises a fixed hood 14 integrally disposed at one end (rod base side) thereof. One end of the reel leg placing surface 12a of the reel seat main body 12 is disposed inside the fixed hood 14.

The reel seat main body 12 is integrally provided with a cylindrical body in which a guide groove is formed at the other end (rod base side) and a screw portion 18. In the cylindrical body, a cylindrical portion placing surface 16a is formed continuously with the reel leg placing surface 12a of the reel seat main body 12 or with a slight step. In one embodiment of the present disclosure, a step for disposing the back surface holding portion of the reel leg holding portion 28 is formed between the reel leg placing surface (reel leg placing portion) 12a and the cylindrical portion placing surface 16a so that a back surface holding portion of the reel leg holding portion 28, which will be described later, on which the rear surface (bottom surface) 6b of the reel leg 6a is placed and the reel leg placing surface 12a are as flush as possible. The cylindrical portion placing surface 16a is also formed continuously with the screw portion 18. At the other end (rod bottom side), a moving hood 22 is attached to the outside of the cylindrical body and the screw portion 18 so as to be movable in the axial direction. Here, the reel seat 9 may be referred to as comprising the reel seat main body 12 and the moving hood 22, or the reel seat main body 12, the moving hood 22, and the fixing nut 8, but details are omitted.

As illustrated in FIG. 2, in the fixed hood 14 of the reel seat main body 12, an opening 14a that receives one end of the reel leg 6a is opened toward the moving hood 22. The opening 14a of the fixed hood 14 is formed such that the height of an inner surface gradually decreases toward a front of the reel seat main body 12. When one end of the reel leg 6a is received in the opening 14a and the one end of the reel leg 6a is pressed by the opening 14a, the reel leg 6a is biased (pressed) toward the reel leg placing surface 12a disposed in the fixed hood 14.

Note that the fixed hood 14 is not limited to being disposed integrally with the reel seat main body 12, and may be formed in a structure separate from the reel seat main body 12 with a metal or a hard synthetic resin and firmly fixed to the reel seat main body 12. In a case of being formed of metal, it is preferable to dispose a resin member at a portion in contact with the reel leg 6a of the reel 6 to prevent damage to each member due to contact between metals.

The moving hood 22 of the present embodiment is formed in a sleeve shape penetrating an axial hole through which the screw portion 18 of the reel seat main body 12 is inserted, and comprises a tightening nut 24, a hood main body 26, and the reel leg holding portion 28 fixed inside the hood main body 26. The tightening nut 24 is rotatably connected to a rear portion (rod bottom side) of the hood main body 26. The tightening nut 24 is formed of, for example, synthetic resin, metal, polyamide synthetic fiber. ABS resin, aluminum, brass, or the like, the hood main body 26 is formed of, for example, metal (SUS, brass) or the like, and the reel leg holding portion 28 is formed of, for example, polyamide-based synthetic fiber or the like. The fixing nut 8, which will be described in detail later, is detachably provided on the reel seat main body 12 at the rear portion (rod bottom side) of the tightening nut 24. The fixing nut 8 is formed of a material having appropriate elasticity so as to open and close with a spring property in an appropriate range (the same applies to a fixing nut 30 described later). Further, the fixing nut 8 is formed of a resin or a metal, and can be formed of, for example, a general-purpose plastic such as ABS, acryl, polyethylene, or polypropylene, an engineering plastic such as polyacetal, polyamide, polyethylene terephthalate, or polycarbonate, a super engineering plastic such as polyphenylene sulfide, a liquid crystal polymer, polyether ether ketone, or polyether sulfone, or a metal such as aluminum, titanium, or stainless steel, but is not intended to be limited thereto (the same applies to the fixing nut 30 described later). Further, the fixing nut 8 can be formed by injection molding or a 3D printer technique using these materials, for example (the same applies to the fixing nut 30 described later).

A female screw to be screwed with the screw portion 18 is formed on an inner peripheral side of the tightening nut 24, and the outer peripheral side is formed to be less slippery and to be easily rotated. A front end of the tightening nut 24 is connected to a rear end of the hood main body 26 in a state of being relatively rotatable and prevented from coming off. A flange portion extending in a radially inward reduced state at the rear end of the hood main body 26 may be fitted to a flange portion extending in a radially outward reduced state at the front end of the tightening nut 24 so as to be prevented from coming off while allowing relative rotation freely.

Note that the connection structure between the tightening nut 24 and the hood main body 26 may be reversed. That is, it is also preferable that the flange portion extending in a radially outward enlarged state of the rear end of the hood main body 26 is fitted to the flange portion extending in a radially inward reduced state of the front end of the tightening nut 24 so as to prevent the flange portion from coming off while allowing relative rotation freely. In addition, the flange portion extending radially inward or radially outward is preferably continuous over the entire circumference, but may be discontinuous.

The tightening nut 24 is screwed with the screw portion 18 of the reel seat main body 12 and rotatably disposed. The hood main body 26 is connected to the tightening nut 24. Thus, when the tightening nut 24 is rotated in the forward direction with respect to the screw portion 18, the tightening nut 24 approaches the fixed hood 14, and the hood main body 26 of the moving hood 22 approaches the fixed hood 14. On the other hand, when the tightening nut 24 is rotated in the opposite direction with respect to the screw portion 18, the tightening nut 24 is separated from the fixed hood 14, and the hood main body 26 of the moving hood 22 is separated from the fixed hood 14.

The hood main body 26 moved in the axial direction of the reel seat main body 12 by the rotation of the tightening nut 24 has an opening 26a that is opened on the front side and the inner peripheral side and is fixed in a state where the reel leg holding portion 28 for receiving the rear end of the reel leg 6a of the fishing reel 6 is disposed. The opening 26a of the hood main body 26 faces the opening 14a of the fixed hood 14 when the moving hood 22 is attached to the screw portion 18 of the reel seat main body 12. The opening 26a of the hood main body 26 is formed such that the height of the inner surface gradually decreases toward the rear, contrary to the opening 14a of the fixed hood 14.

Next, details of the fixing nut 8 according to one embodiment of the present disclosure will be described with reference to FIGS. 2, 3, 4, and 5. The fixing nut 8 according to one embodiment of the present disclosure is a cylindrical fixing nut 8 that is guided by an outer surface of a reel seat main body 12 on which a reel leg placing portion 12a on which a reel leg 6a is placed is formed and holds a position in an axial direction of a cylindrical moving hood 22 movable along the axial direction of the reel seat main body 12, the fixing nut 8 being provided on the outer surface of the reel seat main body 12, the fixing nut 8 comprising an engaging portion 15 and an engaged portion 16, in which the fixing nut 8 is made detachable from the reel seat main body 12 by releasing engagement between the engaging portion 15 and the engaged portion 16.

Figure 3A:
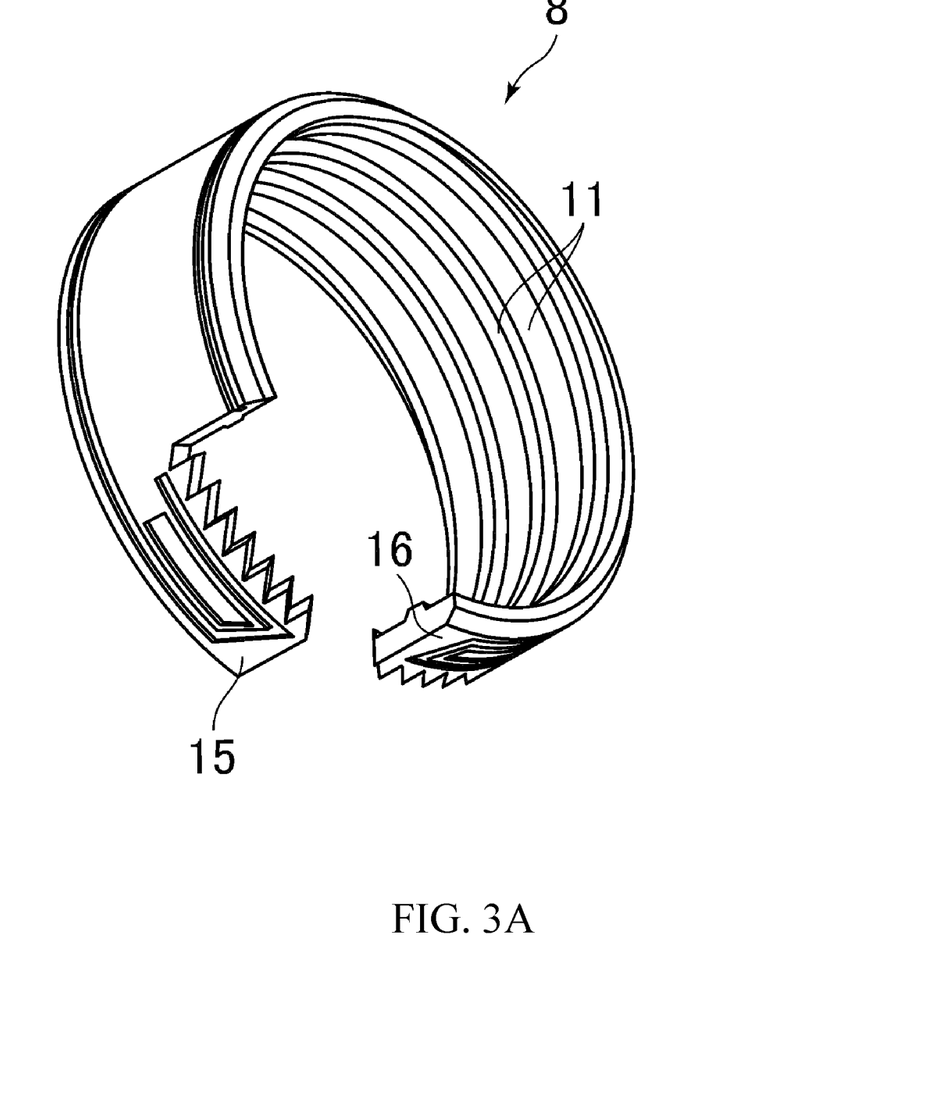
FIGS. 3A to 3D are views illustrating a fixing nut according to one embodiment of the present disclosure.
Figure 4:
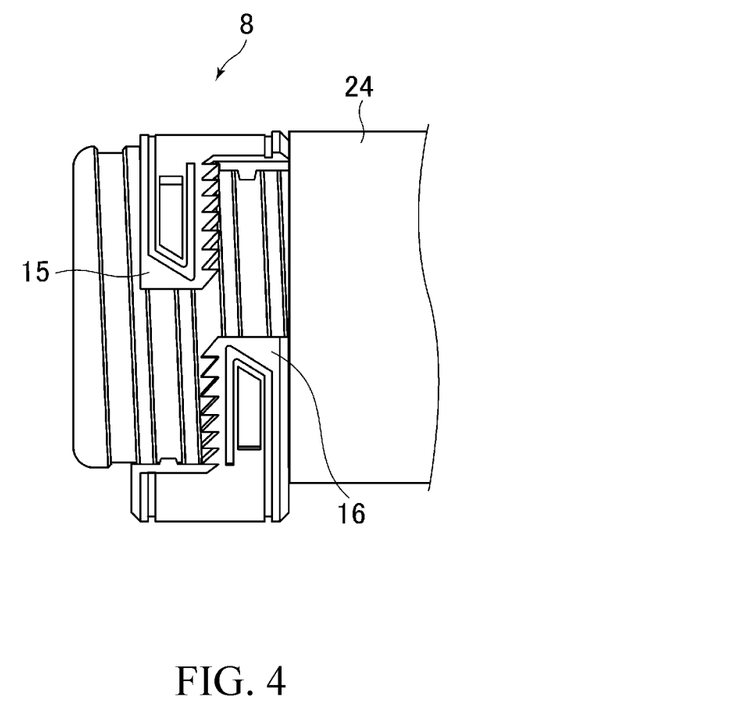
FIG. 4 is a view illustrating a disengaged state of the fixing nut according to one embodiment of the present disclosure.
Figure 5A:
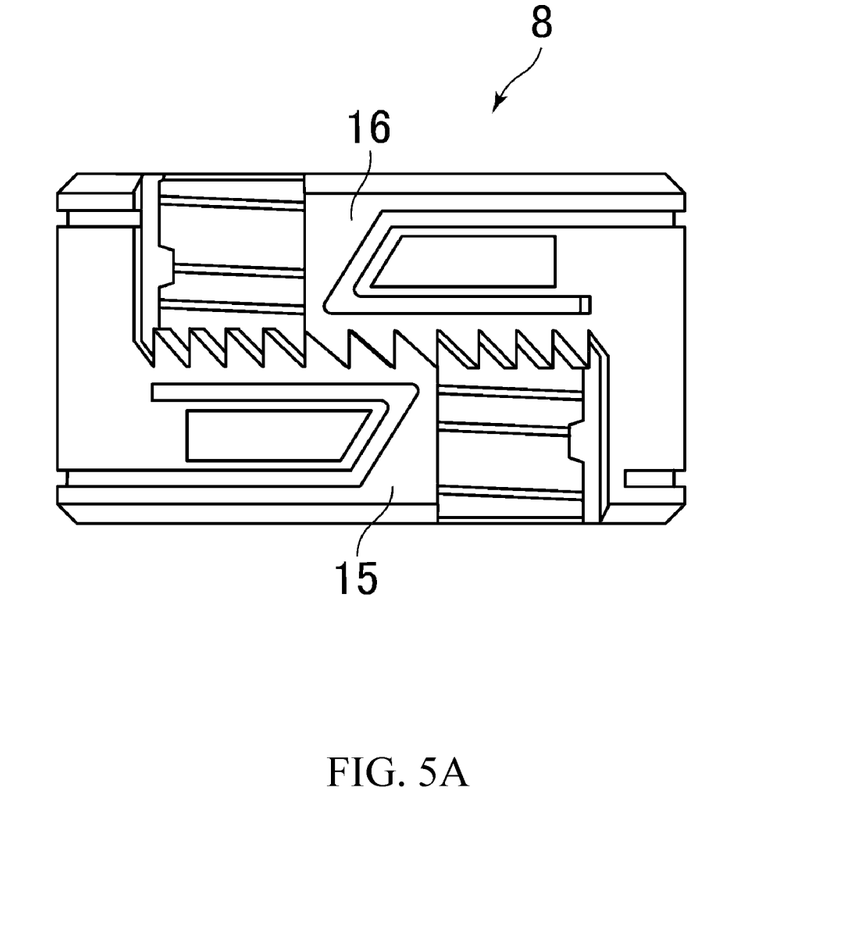
FIGS. 5A and 5B are views illustrating the disengaged state of the fixing nut according to one embodiment of the present disclosure.
Figure 5B:
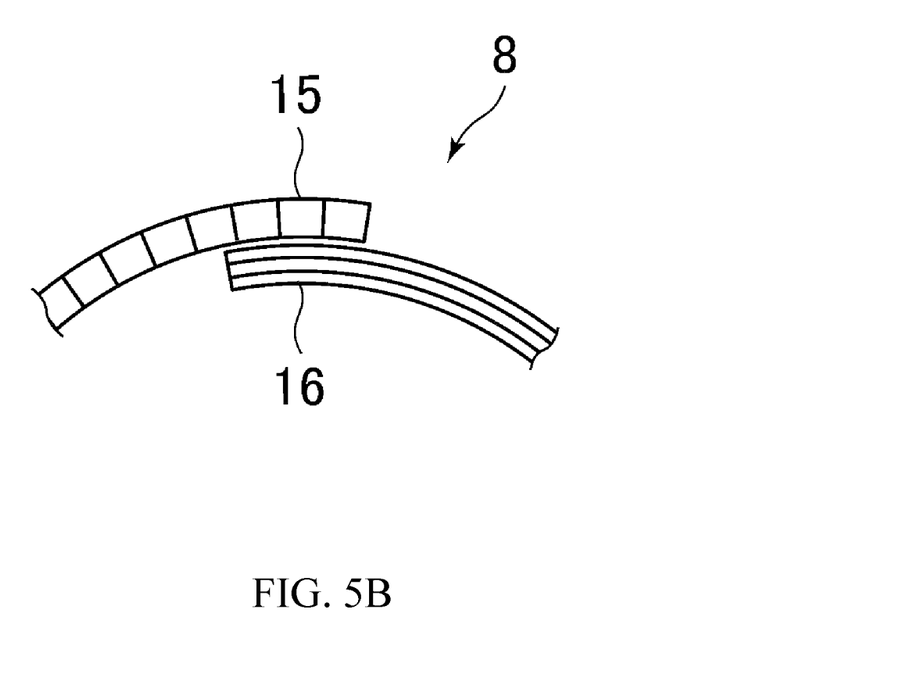

Here, the engaging portion 15 may be referred to as an engaged portion, and the engaged portion 16 may be referred to as an engaging portion. However, in the present specification, for convenience, the engaging portion 15 and the engaged portion 16 are used. Further, the state illustrated in FIG. 2 is a case where the engaging portion 15 of the fixing nut 8 and the engaged portion 16 are in an engaged state, and the state illustrated in FIG. 3A, FIG. 4, or FIG. 5 is a case where the engaging portion 15 and the engaged portion 16 of the fixing nut 8 are in a disengaged state (non-engaged state). Note that the fixing nut 8 can be moved in the axial direction by forming a female screw 11 screwed to a screw portion 18 formed in the reel seat main body 12 on the inner peripheral side and screwing and rotating the fixing nut 8 with respect to the reel seat main body 12 while being engageable with the reel seat main body 12.

With the fixing nut according to one embodiment of the present disclosure, it is possible to provide a fishing rod comprising a fixing nut that can flexibly cope with the diameter dimensions of various reel seats, is not easily loosened during use, and is less likely to cause a sense of discomfort when touched with a finger while being freely detachable from the reel seat main body. More specifically, it is possible to prevent the floating hood from loosening. As described above, by using the fixing nut, the movement of the tightening nut of the moving hood in the rod tip direction can be reliably prevented. Further, in a case of fixing the reel, by tightening the moving hood 22 and the fixing nut 8 in this order, a gap (backlash) between the male screw of the reel seat main body 12 and the female screw of the moving hood 22 and the fixing nut 8 can be reduced, so that it is possible to provide a strong fixing force that is hardly loosened.

Figure 3B:
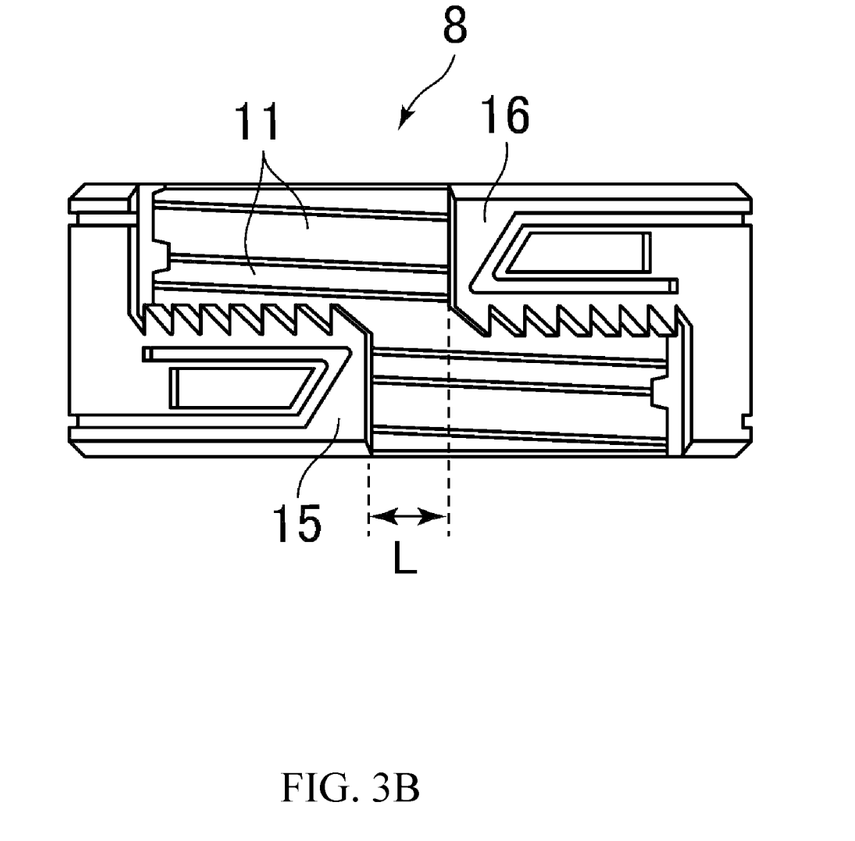
Figure 3C:
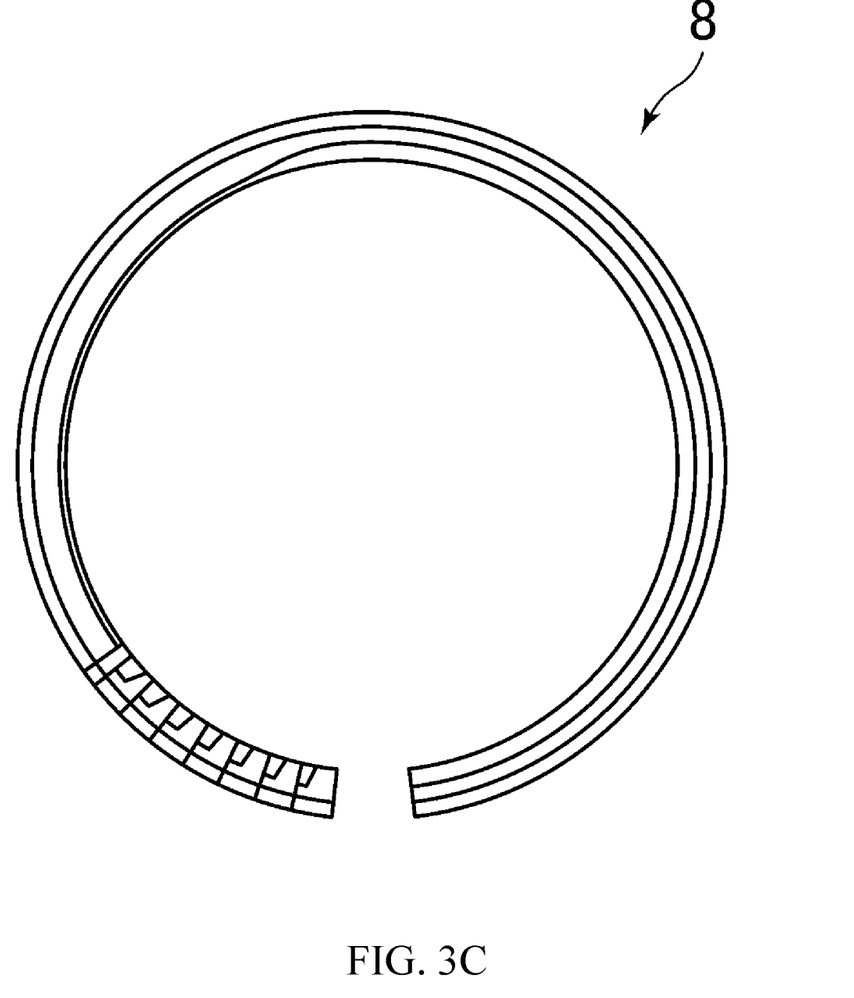
Figure 3D:
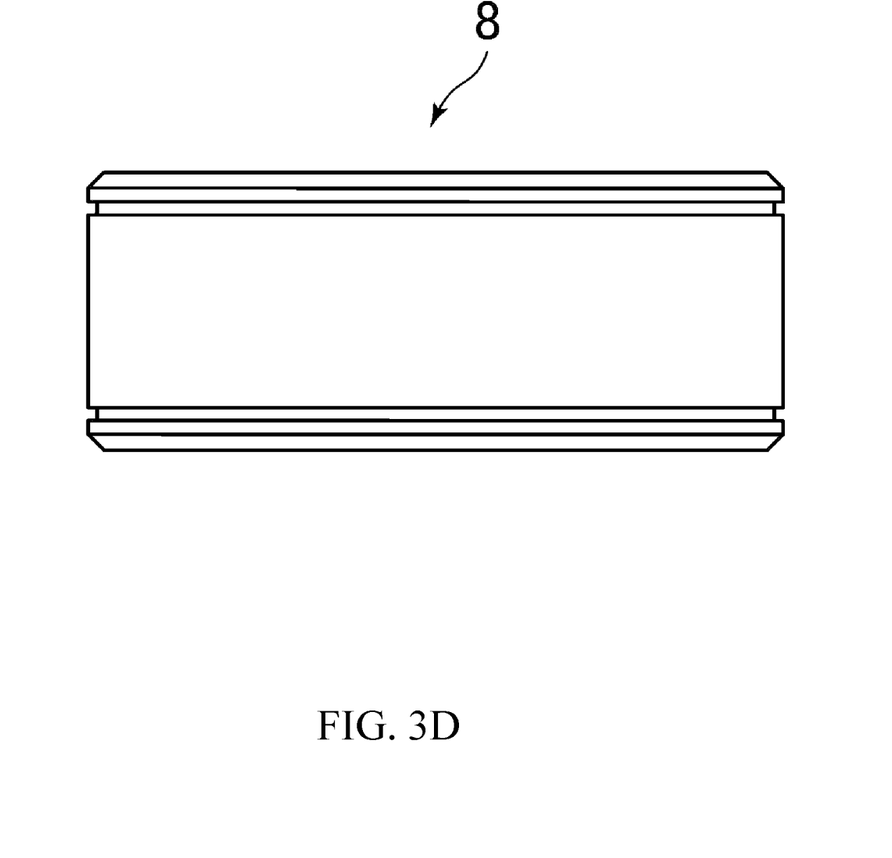

Next, as illustrated in FIG. 3B, in the fixing nut 8 according to one embodiment of the present disclosure or the fishing rod reel seat 9 comprising the fixing nut 8, the engaging portion 15 and the engaged portion 16 are configured to be separated from each other by a separation distance (L) in the circumferential direction of the fixing nut 8 in the disengaged state. With such a configuration, even a material having small elasticity can be easily attached and detached. In this case, when the fixing nut 8 is changed from the disengaged state to the engaged state, for example, by bringing the engaging portion 15 and the engaged portion 16 close to each other in the circumferential direction of the fixing nut 8, the engaging portion 15 can be engaged with the engaged portion 16.

As illustrated in FIGS. 5A and 5B, in the fixing nut 8 according to one embodiment of the present disclosure or the fishing rod reel seat 9 comprising the fixing nut 8, the engaging portion 15 and the engaged portion 16 are configured such that the engaging portion and the engaged portion partially overlap each other when viewed in the circumferential direction of the fixing nut 8 in the disengaged state (non-engaged state) (see FIG. 5B). With such a configuration, it is possible to prevent a decrease in fixing force due to opening in a material having large elasticity. In this case, when the fixing nut 8 is changed from the disengaged state to the engaged state, for example, the engaging portion 15 can be engaged with the engaged portion 16 by pressing the engaging portion 15 in a radial direction of the fixing nut 8.

Figure 6:
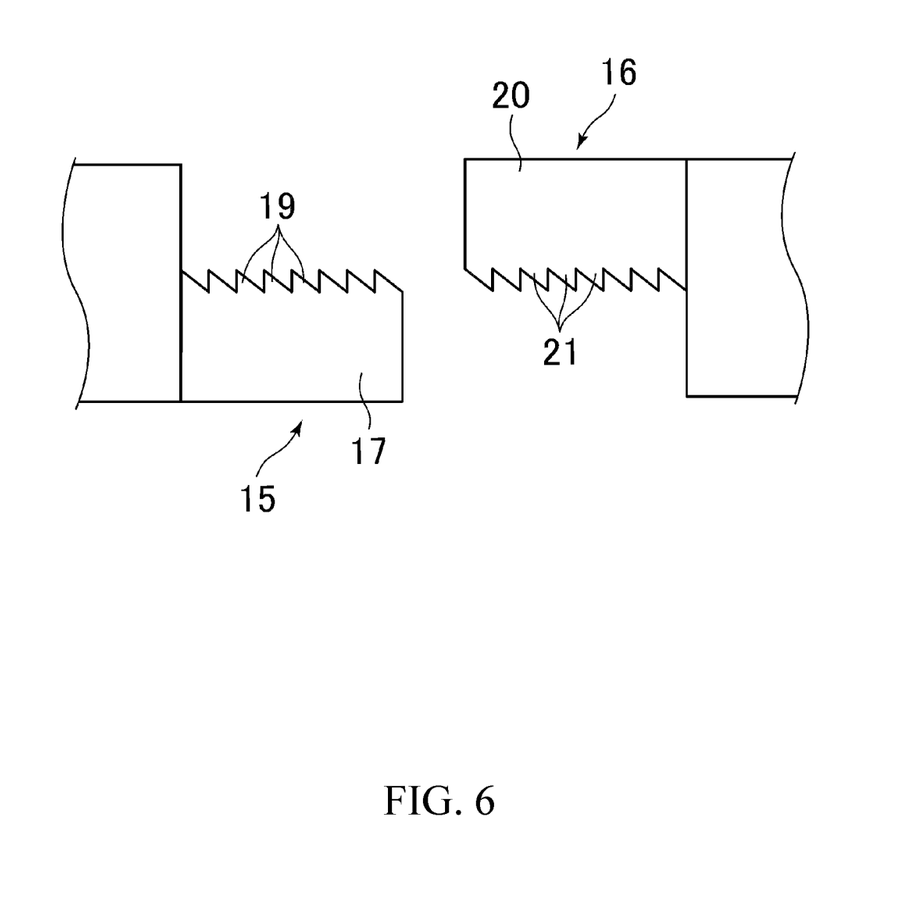
FIG. 6 is a view illustrating a method for molding a fishing rod handle member according to one embodiment of the present disclosure.

Next, as illustrated in FIG. 6, in the fixing nut 8 according to one embodiment of the present disclosure or the fishing rod reel seat 9 comprising the fixing nut 8, the engaging portion 15 and the engaged portion 16 comprises base portions 17 and 20 and uneven portions 19 and 21, respectively. In the uneven portion, a plurality of recessed portions and protruding portions is alternately formed so as to be engageable (meshing) with each other, and can be formed in a sawtooth shape, for example. In addition, a quadrangular shape, a trapezoidal shape, or a claw-like shape is conceivable, but the shape is not limited to a specific aspect. Thus, the fixing nut 8 can be brought into the engaged state by engaging the uneven portion 19 of the engaging portion 15 and the uneven portion 21 of the engaged portion 16 with each other.

Figure 7:
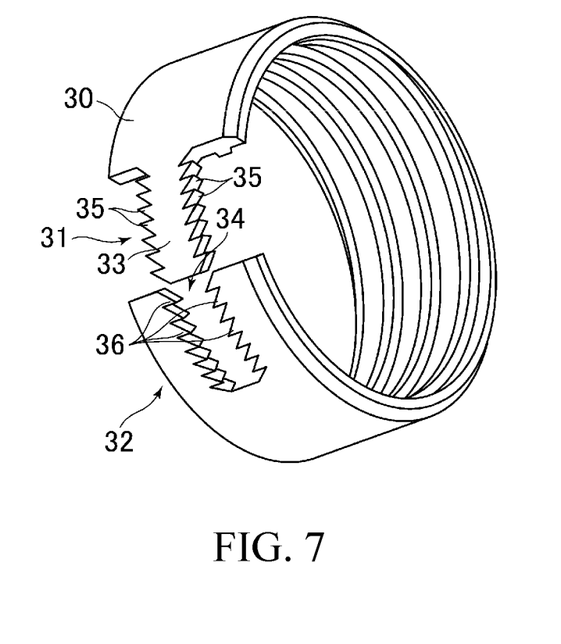
FIG. 7 is a view illustrating a fixing nut according to another embodiment of the present disclosure.

Next, a fixing nut 30 or a fixing nut 30 in a fishing rod reel seat 9 according to another embodiment of the present disclosure will be described with reference to FIG. 7. As illustrated in FIG. 7, the fixing nut 30 comprises an engaging portion 31 and an engaged portion 32, the engaging portion 31 is a protruding portion 33 protruding in the circumferential direction of the fixing nut, and the engaged portion 32 comprises a recessed portion 34 capable of accommodating at least a part of the protruding portion 33. Here, various shapes and structures of the protruding portions 33 are conceivable other than the illustrated aspect, and for example, a plurality of the protruding portions 33 may be provided in parallel, and are not limited to a specific aspect. In addition, the shape and structure of the recessed portion 34 can be variously considered in accordance with the shape and structure of the protruding portion 33 other than the illustrated aspect, and in a case where a plurality of protruding portions 33 is provided, a plurality of recessed portions 34 can also be provided in accordance therewith, but it is not limited to a specific aspect.

In the fixing nut 30 or the fixing nut 30 in the fishing rod reel seat 9 according to another embodiment of the present disclosure, the protruding portion 33 of the engaging portion 31 and the recessed portion 34 of the engaged portion 32 are formed with respective uneven portions 35 and 36 at the engaging portion and the engaged portion. In the uneven portions 35 and 36, a plurality of recessed portions and protruding portions is alternately formed so as to be engageable (meshing) with each other, and can be formed in a sawtooth shape, for example. In addition, a quadrangular shape, a trapezoidal shape, or a claw-like shape is conceivable, but the shape is not limited to a specific aspect. In this manner, by engaging (meshing) the uneven portion 35 of the engaging portion 31 and the uneven portion 36 of the engaged portion 32 with each other, the fixing nut 30 can be engaged.

A fishing rod reel seat 9 according to one embodiment of the present disclosure comprises a reel seat main body 12 on which a reel leg placing portion 12a on which a reel leg 6a is placed is formed, a cylindrical moving hood 22 that is guided by an outer surface of the reel seat main body 12 and is movable along an axial direction of the reel seat main body 12, and a cylindrical fixing nut 8 or 30 that is provided on the outer surface of the reel seat main body 12 and holds a position of the moving hood 22 in the axial direction, in which the fixing nut 8 or 30 comprises an engaging portion 15 or 31 and an engaged portion 16 or 32, and the fixing nut 8 or 30 is made detachable from the reel seat main body 12 by releasing engagement between the engaging portion 15 or 31 and the engaged portion 16 or 32.

With the fishing rod reel seat according to one embodiment of the present disclosure, it is possible to provide a fishing rod reel seat comprising the fixing nut that can flexibly cope with the diameter dimensions of various reel seats, is not easily loosened during use, and is less likely to cause a sense of discomfort when touched with a finger while being freely detachable from the reel seat main body. More specifically, it is possible to prevent the floating hood from loosening. As described above, by using the fixing nut, the movement of the tightening nut of the moving hood in the rod tip direction can be reliably prevented. Further, in a case of fixing the reel, by tightening the moving hood 22 and the fixing nut 8 in this order, a gap (backlash) between the male screw of the reel seat main body 12 and the female screw of the moving hood 22 and the fixing nut 8 can be reduced, so that it is possible to provide a strong fixing force that is hardly loosened.

A fishing rod 1 according to one embodiment of the present disclosure is provided with any one of the fishing rod reel seats 9 comprising the fixing nut 8 or 30 and the rod body 2. With the fishing rod according to one embodiment of the present disclosure, it is possible to provide a fishing rod comprising the fishing rod reel seat comprising the fixing nut that can flexibly cope with the diameter dimensions of various reel seats, is not easily loosened during use, and is less likely to cause a sense of discomfort when touched with a finger while being freely detachable from the reel seat main body. More specifically, it is possible to prevent the floating hood from loosening. As described above, by using the fixing nut, the movement of the tightening nut of the moving hood in the rod tip direction can be reliably prevented. Further, in a case of fixing the reel, by tightening the moving hood 22 and the fixing nut 8 in this order, a gap (backlash) between the male screw of the reel seat main body 12 and the female screw of the moving hood 22 and the fixing nut 8 can be reduced, so that it is possible to provide a strong fixing force that is hardly loosened.

The dimensions, materials, and arrangement of components described in the present specification are not limited to those explicitly described in the embodiment. The components can have any modified dimensions, materials, and arrangement that are included within the scope of the present disclosure. In addition, components not explicitly described herein can be added to the described embodiments, or some of the components described in each embodiment can be omitted.

REFERENCE SIGNS LIST

1 Fishing rod
2 Rod body
3 Base rod
5 Middle rod
6 Reel
6a Reel leg
7 Tip rod
9 Reel seat
10 Fishing line guide
11 Female screw
12 Reel seat main body
12a Reel leg placing surface
14 Fixed hood
15 Engaging portion
16 Engaged portion
17 Base portion
18 Screw portion
19 Uneven portion
20 Base portion
21 Uneven portion
22 Moving hood
24 Tightening nut
26 Hood main body
28 Reel leg holding portion
30 Fixing nut
31 Engaging portion
32 Engaged portion
33 Protruding portion
34 Recessed portion
35 Uneven portion
36 Uneven portion

What is claimed is:

1. A fishing rod reel seat comprising
a reel seat main body with a reel leg placing portion configured to have a reel leg placed thereon,
a cylindrical moving hood that is guided by an outer surface of the reel seat main body and is movable along an axial direction of the reel seat main body, and
a cylindrical fixing nut that is on the outer surface of the reel seat main body and holds a position of the moving hood in the axial direction, wherein
the fixing nut comprises
a main body,
an engaging portion at a first end of the main body in a circumferential direction of the main body, the engaging portion having a plurality of protruding portions that are arranged in a circumferential direction of the fixing nut and that protrude away from the engaging portion in the axial direction, and
an engaged portion at a second end of the main body in the circumferential direction of the main body, the engaged portion having a plurality of recessed portions that are arranged in a circumferential direction of the fixing nut and that are recessed in the axial direction and into which the protruding portions are configured to protrude,
the fixing nut is made detachable from the reel seat main body by releasing engagement between the engaging portion and the engaged portion, and
the first end and the second end are parts of a continuous portion of the fixing nut.

2. The fishing rod reel seat according to claim 1, wherein each of the engaging portion and the engaged portion comprises a base portion and an uneven portion.

3. The fishing rod reel seat according to claim 1, wherein the engaging portion and the engaged portion are separated from each other in the circumferential direction of the fixing nut in a disengaged state.

4. The fishing rod reel seat according to claim 1, wherein the engaging portion and the engaged portion partially overlap each other when viewed in the circumferential direction of the fixing nut in a disengaged state.

5. The fishing rod reel seat according to claim 1, wherein the engaging portion protrudes in the circumferential direction of the fixing nut, and the engaged portion comprises each recessed portion of the plurality of recessed portions capable of accommodating at least a part of each protruding portion of the plurality of protruding portions.

6. A fishing rod comprising:
the fishing rod reel seat according to claim 1; and
a rod body.

7. A cylindrical fixing nut that is guided by an outer surface of a reel seat main body on which a reel leg placing portion on which a reel leg is placed is formed and holds a position in an axial direction of a cylindrical moving hood movable along the axial direction of the reel seat main body, the fixing nut being on the outer surface of the reel seat main body, the fixing nut comprising
a main body,
an engaging portion at a first end of the main body in a circumferential direction of the main body, the engaging portion having a plurality of protruding portions that are arranged in a circumferential direction of the fixing nut and that protrude away from the engaging portion in the axial direction, and
an engaged portion at a second end of the main body in the circumferential direction of the main body, the engaged portion having a plurality of recessed portions that are arranged in a circumferential direction of the fixing nut and that are recessed in the axial direction and into which the protruding portions are configured to protrude, wherein
the fixing nut is made detachable from the reel seat main body by releasing engagement between the engaging portion and the engaged portion, and
the first end and the second end are parts of a continuous portion of the fixing nut.

* * * * *